US006106666A

United States Patent [19]

Martin

[11] Patent Number: 6,106,666

[45] Date of Patent: Aug. 22, 2000

[54] APPARATUS FOR PREPARING A SELF-MAILER EXITING A PRINTER

[76] Inventor: Samuel W. Martin, Martin Rd., Weston, Conn. 06883

[21] Appl. No.: 09/154,979

[22] Filed: Sep. 17, 1998

Related U.S. Application Data

[60] Provisional application No. 60/059,157, Sep. 17, 1997.

[51] Int. Cl.[7] .............................. B32B 31/00; B43M 5/00

[52] U.S. Cl. .................................... 156/442.1; 156/442.2; 156/443; 156/384

[58] Field of Search .............................. 156/441.5, 442.1, 156/442.2, 443, 217, 227, 384, 387

[56] References Cited

U.S. PATENT DOCUMENTS

| | | | |
|---|---|---|---|
| 4,701,233 | 10/1987 | Beck et al. | 156/443 X |
| 5,118,379 | 6/1992 | Martin et al. | 156/442.1 |
| 5,192,389 | 3/1993 | Martin | 156/442.1 X |
| 5,466,328 | 3/1993 | Nagashima | 156/443 |
| 5,527,418 | 6/1996 | Ginsberg | 156/442.1 X |
| 5,897,733 | 4/1999 | Stevens | 156/443 X |

*Primary Examiner*—Mark A. Osele

[57] ABSTRACT

A folder sealer apparatus for creating individual mailers from sheets exiting printers, such as personal laser printers. The apparatus is adapted to sit above a printer of the type which delivers printed sheets to a tray on the top side of the printer. The folder sealer has a guide which when extended directs printed sheets to the folder and sealer mechanism but when retracted allows the printed sheets to advance into the printer tray without being folded and sealed.

4 Claims, 4 Drawing Sheets

APPARATUS FOR PREPARING A SELF-MAILER EXITING A PRINTER

This application claims benefit of Provisional application Ser. No. 60/059,157 filed Sep. 17, 1997.

BACKGROUND OF THE INVENTION

This invention is an improved configuration of a folder sealer mechanism.

Folder sealer mechanisms and related equipment are disclosed in U.S. Pat. Nos. 4,834,699: to: Martin: for: BUCKLE CHUTE PAPER FOLDING APPARATUS: issued May 30, 1989, 5,006,195: to: Martin et al: for: APPARATUS FOR FOLDING AND SEALING A FORM ALONG A TRANSVERSE EDGE: issued Apr. 19, 1991, 5,048,748: to: Martin et al: for: SINGLE SHEET SELF-MAILING FORM WITH IMPROVED OPENING CHARACTERISTICS: issued Sep. 17, 1991, 5,114,067: to: Martin et al: for: SINGLE SHEET SELF-MAILING FORM WITH IMPROVED FEEDING CHARACTERISTICS: issued May 19, 1992 and 5,192,389: to: Martin: for: APPARATUS FOR PREPARING A SELF-MAILER HAVING PRINTER, FOLDER AND TRANSPORT MEANS: issued Mar. 9, 1993. The disclosures of these patents are incorporated by reference. These earlier patents depict a folder sealer attached to the rear of a laser printer having an alternate exit at the rear whereby a self-mailer form sheet can be captured as it exits the printer, then folded, sealed and stacked ready for mailing in a one step automatic operation. This is a viable solution for printers having such a rear exit, but, since that time, the trend among laser printers has been toward single exits which stack their output face down on a sloped tray on top of the printers. The result of this shift in printer design is that the market for this folder sealer configuration has become extremely limited.

Another shortcoming of the rear exit design is that it cannot work with those printers that print as the paper travels from back to front because it allows the paper trays to be placed under the printer thus reducing the desk space required. This group of printers deliver the finished sheets print side down on a tray slanting to the rear so capturing sheets print side up would place the folding mechanism right in front of the machine covering both the controls and paper tray access.

The aforementioned patents also depict a self-mailer design that has a major advantage over most self-mailer designs in that only one tear is required by the recipient to open and turn it into an almost conventional envelope and insert.

The instant invention will be able to process both this self-mailer form and other more conventional forms as they are printed by the majority of today's desktop office printers.

Thus, it is the object of this invention to provide apparatus for attachment to any desktop printer that delivers its output print-side-down to an output accumulation tray on its upper structure, whether towards the front or the back, to capture, fold, and seal various printed self-mailer sheets and stack finished self-mailers.

BRIEF SUMMARY OF THE INVENTION

The above objects are achieved and the disadvantages of the prior art overcome in accordance with the subject invention by means of an apparatus for processing self-mailers which includes mounting hardware and a folder which selectively captures desktop printer self-mailer form sheet output that it then folds, seals and stacks in its mailable configuration.

In a preferred embodiment of the subject invention, a bridge structure is custom designed to fit a specific model printer and position a folder-sealer apparatus above the printer with a paper guide to drop down in front of the printer's output rollers and intercept form sheets as they exit and guide them into the nip of the folder's rollers to be folded, sealed and stacked In another preferred embodiment of the subject invention, a fully adjustable bridge structure is designed to be adaptable to many printer models so that it can precisely position a folder-sealer apparatus to capture that printer's form sheets and process them into self-mailers ready to mail.

Further preferred embodiments of the subject invention include a version of the folder sealer configuration to accommodate self-mailer form sheets that carry re-moistenable glue strips on the print side of the form as well a version to accommodate those with glue strips on the opposite side.

Another preferred embodiment of the subject invention seals self-mailer form sheets that utilize pressure-sensitive glue.

The subject invention advantageously achieves the above objectives, in that it provides an apparatus that can be attached to the vast majority of desktop printers already in place in millions of offices and in that it will process many of the self-mailer form sheets already on the market as well as the form sheet described in the aforementioned patents.

Other objects and advantages of the subject invention will be readily apparent to those skilled in the art from consideration of the attached drawings and the detailed description set forth below.

DETAILED DESCRIPTION OF PREFERRED EMBODIMENTS

Figure 1:
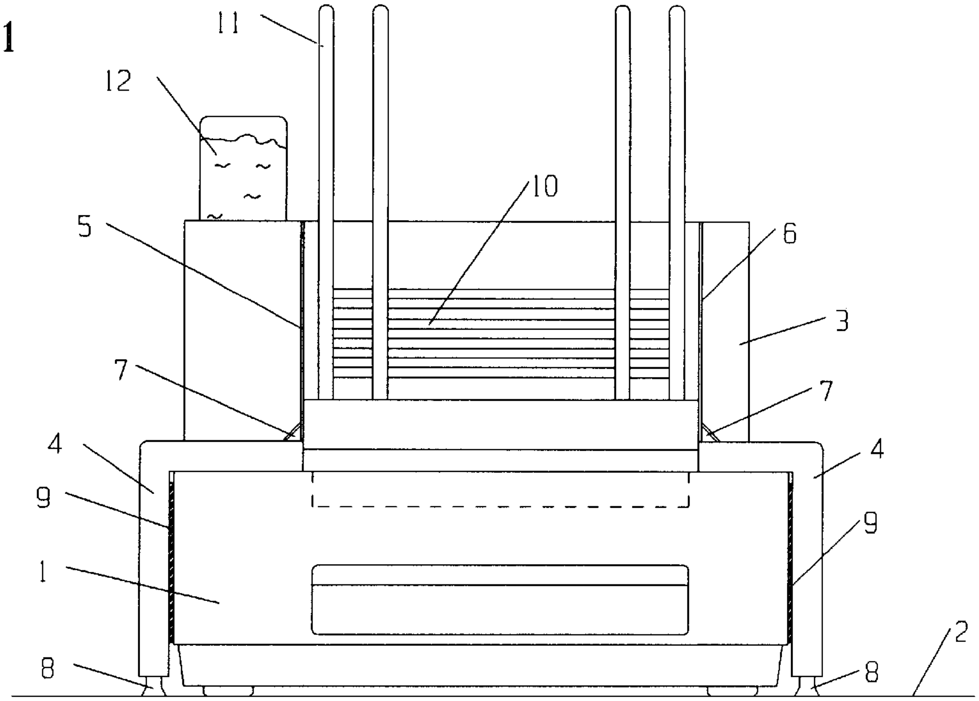
FIG. 1 shows a front elevation of a laser printer with a folder sealer apparatus mounted on a bridge designed to span and just fit a specific printer.
Figure 2:
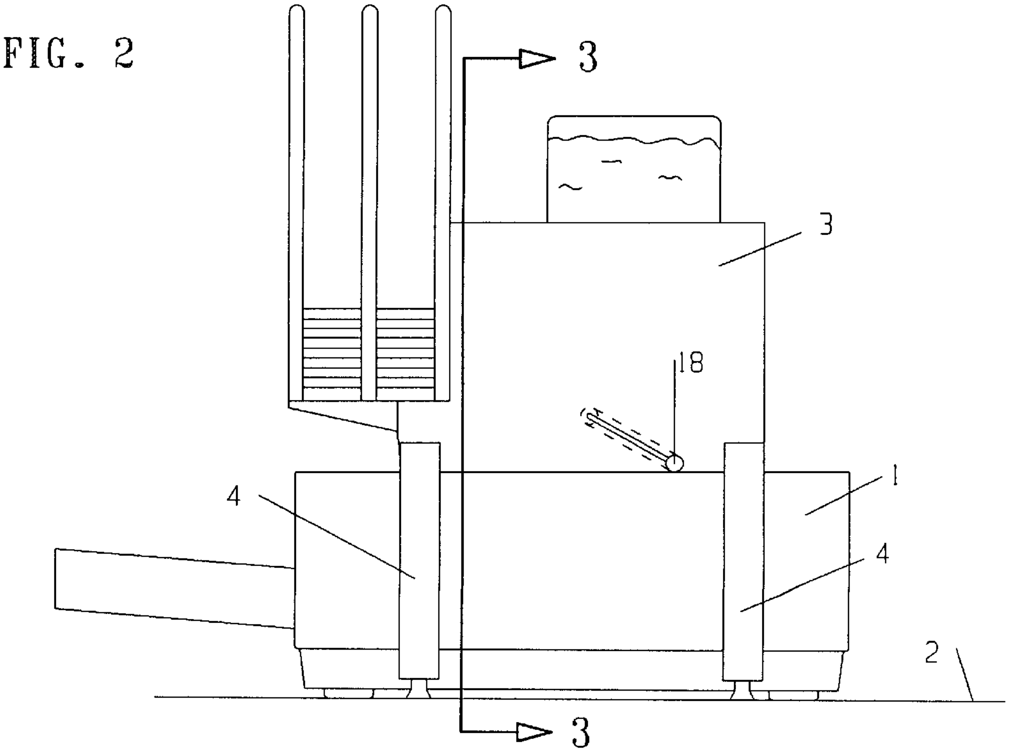
FIG. 2 shows a side elevation of the same printer with the folder sealer on a bridge specifically designed for that printer size.

FIGS. 1 & 2 show a typical laser printer 1, resting on a level surface 2, with a folder sealer apparatus 3, mounted on a bridge structure consisting of 4 legs 4 which are sized for this specific printer. The legs are attached to the folder side frames 5 and 6 through gussets 7. The legs have non-marking feet 8 and rest on the same surface 2 as the printer and also have non-marking, soft pads 9 abutting the printer sides which precisely locate the folder sealer's roller centerline on the centerline of the paper path of the printer to assure that the glue strips on re-moistenable forms line up with the sealer's moistening pads 13 and 14 shown in FIG. 3 as well as 50 and 56 shown in FIG. 6.

FIG. 1 also shows a stack of folded and sealed self-mailers 10 in a bottom-up stacker, of the type typical of many mailing machines, with guide posts to contain them 11. A water bottle 12 of the typical chicken feeder variety is also shown which gravity feeds water through typical plumbing, not shown, to the moistening pads 13 and 14.

From FIG. 2 the locations of the legs 4 holding the folder sealer apparatus 3 above the laser printer 1 can be clearly seen.

Figure 3:
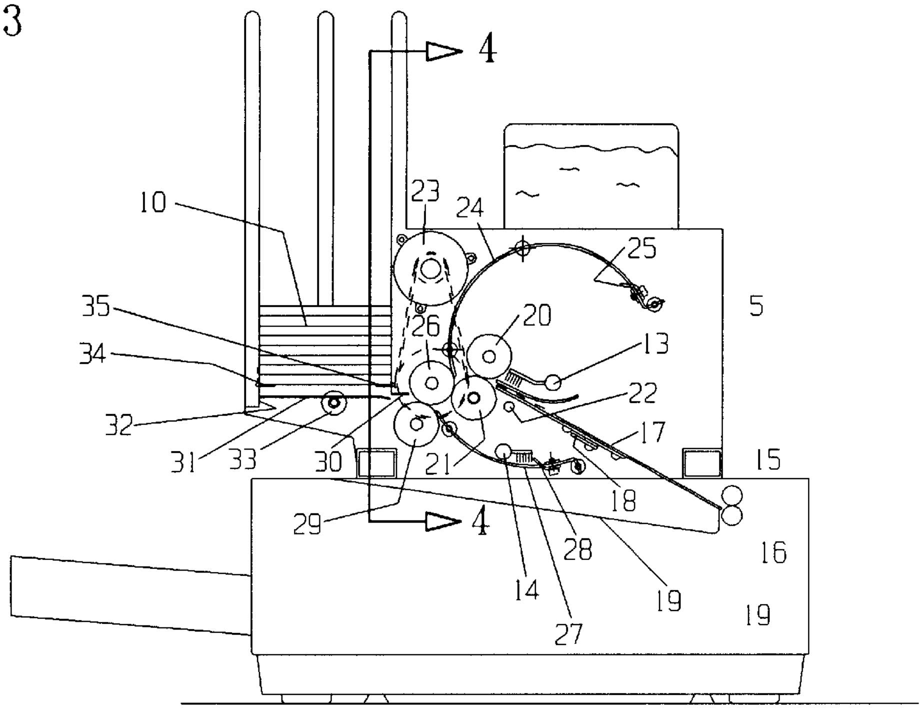
FIG. 3 is a partial section view of FIG. 2 through line 3—3 showing the folding rollers and open, one sided concave buckle chutes adjusted to fold a self-mailer form sheet.

FIG. 3, a section view of the folder sealer mechanism adjusted to fold the self-mailer depicted in U.S. Pat. Nos. 5,048,748 and 5,114,067. This embodiment shows the paper path leading out of the printer's stacking rollers 15 and 16 being intercepted by a lowered or extended paper guide 17. When the paper guide is retracted by positioning handle 18 to the left in FIG. 2, the printer's output feeds onto its accumulation tray 19. When the handle is positioned to the right in FIG. 2 guide 17 deflects the output upwards into the bottom of the folder sealer where its leading edge intercepts the nip of stopped fold rollers 20 and 21 and buckles momentarily to align its leading edge with the nip, a common practice in printing devices. As the leading edge of a self-mailer form passes sensor 22 a timer starts and the motor 23 is then subsequently jogged so that the fold rollers 20 and 21 gain control of the leading edge of the form and the remainder of the form swings free after which the motor 23 again starts and the form is fed into buckle chute 24 until it reaches stop 25 which causes a buckle to form that is then gripped and creased to make the fold by the nip formed by rollers 21 and 26. This folded edge then is fed along buckle chute 27 until it reaches stop 28 at which point another buckle is formed which is gripped and creased to make a second fold by the nip formed by rollers 26 and 29. As the upper folded edge reached stop 28 it encountered moistening pad 14 which wet the full width of the form for sealing against a glue strip at the subsequent fold.

As the completed self-mailer is transported through rollers 26 and 29, it is deflected by guide 30 onto articulated tray 31 and urged into stop 32 by roller 33 at which time tray 31 rises to its upper position pushing the self-mailer, the previously folded pieces 10 and the hinged shelves 34 and 35 past the shelves which drop back down as tray 31 returns to its lower position and the stack of finished self-mailers follow to rest on the shelves 34 and 35.

This folding process is typical of buckle chute folders although the chutes are of the type described in U.S. Pat. Nos. 4,834,699 which allows ample space for the moistening apparatus 13 and 14 shown in FIG. 3 as well as easy access for jam removal. The bottom up stacker is also typical of many mail handling devices.

Figure 4:
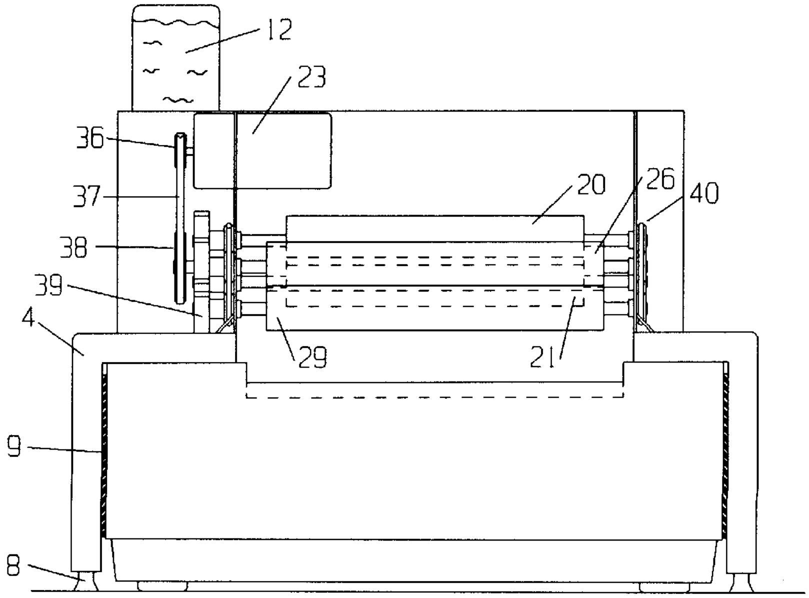
FIG. 4 is a section view, through line 4—4 in FIG. 3, of the folder sealer shown in FIG. 1 that shows the folding rollers and their drive.

From FIG. 4 the drive mechanism and folding rollers of the folding mechanism can be appreciated. Rollers 20 and 21 are just 7.5" long although the self-mailer form sheets are 8.5" wide so that moistened glue strips on the forms will not offset glue onto the rollers. Rollers 26 and 29, however, are a full 8.5" wide in order to squeeze the full width of the form and seal the moistened portions against the mating form section and are never exposed to the glue. Shown also are the motor 23, pulley 36, drive belt 37, pulley 38, gears 39 and garter springs 40 which maintain pressure on the rollers to crease the paper.

Figure 5:
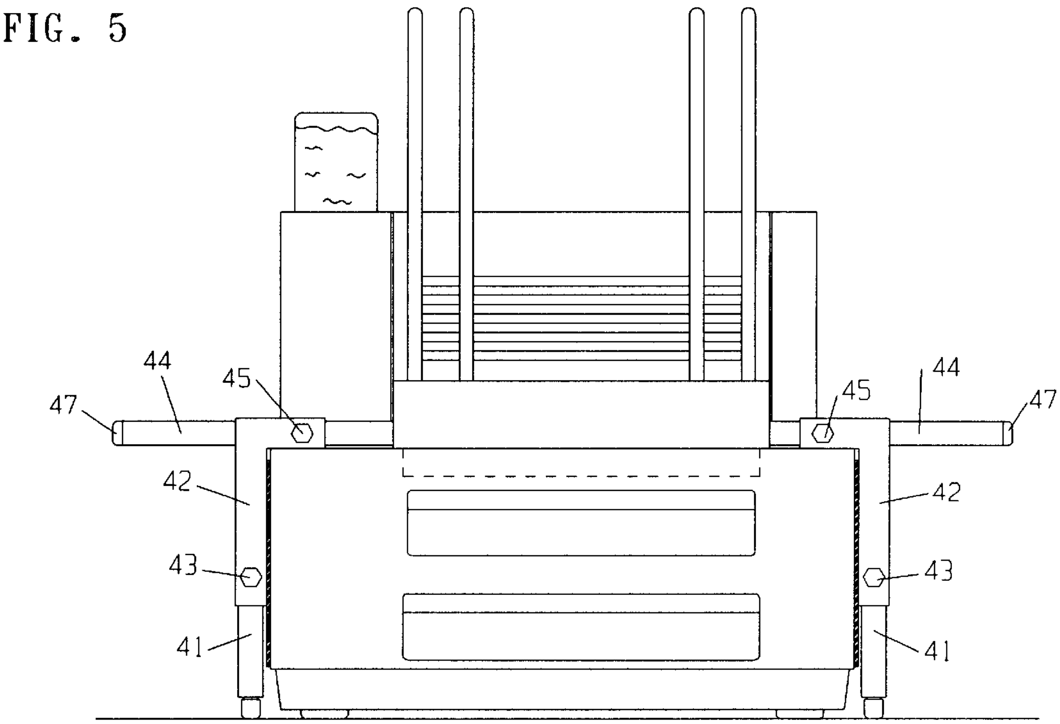
FIG. 5 shows a front elevation of a laser printer with a folder sealer apparatus mounted on a bridge that that can be adjusted to the width and height of any printer.

Turning to FIG. 5, an adjustable version of the folder sealer apparatus mount is shown. The height is adjusted by telescoping legs where the inner tubing 41 slides into the outer tubing 42 and is fixed in position by set screws 43. The telescoping legs are also equipped with non-marking feet 8 and soft pads 9 to maintain proper relationship of the folder sealer to the printer once it is adjusted. The lateral position of the folder sealer is also adjustable since printer width varies as does the location of the paper path centerline. Arms 44 are affixed with gussets 7 to the folder side frames 5 and 6 in the same way as the legs 9 are shown in FIGS. 1 and 4. In this embodiment, the upper part of the legs 42 are also hollow tubing which are laterally adjustable to clamp to arms 44 and are held in position by set screws 45.

The installer first runs a standard 8½" sheet of paper through the printer and stops the machine when the paper is halfway out. Then the installer adjusts the height of the legs to just clear the top surface of the printer's cover 46 and tightens set screws 43. Next, the folder is positioned over the printer so that the exiting paper can be seen. The folder is then moved laterally until arrows (not shown) on the rear cover are aligned with the edges of the paper. The legs are moved inward to just touch the sides of the printer and locked in place by tightening set screws 45. The printed sheet is then removed and the folder sealer apparatus moved toward the back of the printer so that its adjustable guide 17, when extended, will intercept materials exiting the printer's stacking rollers 15 and 16. The installer has the option of sawing off the excess arm length if desired and the plastic plugs 47 can be moved to the new ends.

Figure 6:
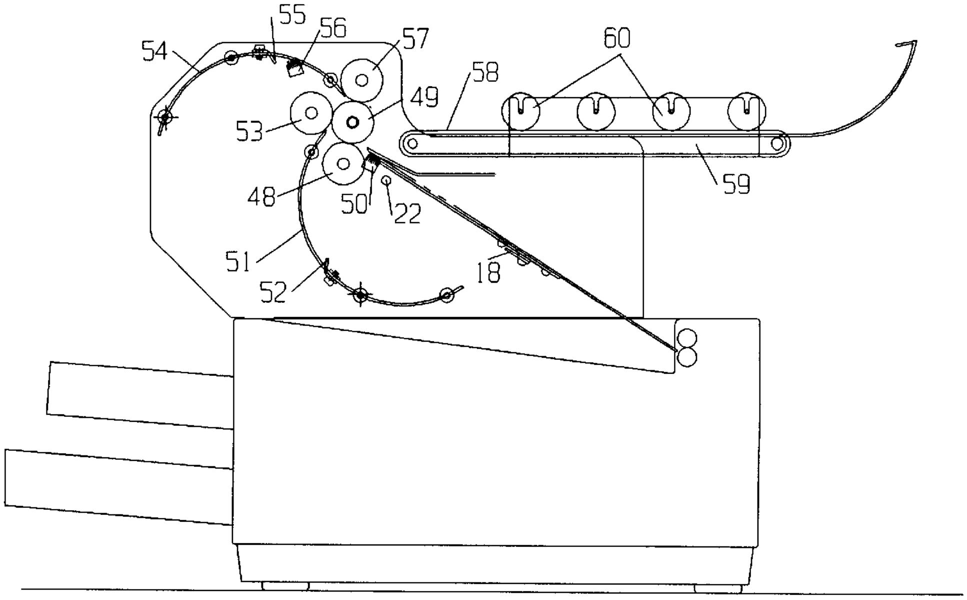
FIG. 6 is a sectioned view of the side elevation of a moistening version folder sealer's fold rollers, drive and moistening brushes.

In the preferred embodiment of FIG. 6, a folder sealer apparatus designed to handle self-mailer form sheets that have remoistenable glue strips on the print side of the form is shown. This form design requires a different folder configuration in order to fold the glue strips toward the inside of the form but operates in a similar manner. In this instance, the paper path lends itself to employment of a belt stacker mechanism 59 instead of the bottom up device used above.

Like the FIG. 3 embodiment, self-mailer form sheets exiting the printers rollers 15 and 16 are intercepted by the extended paper guide 17 which deflects it upwards into the bottom of the folder sealer where its leading edge intercepts the nip of stopped fold rollers 48 and 49 and buckles momentarily so its leading edge aligns with the nip. As it passes sensor 22 which signals the folding motor (not shown) to jog after a slight delay to capture the form's leading edge after alignment. The side glue strips also get moistened as they pass over moistening pads 50 but do not offset any glue since roller 48 is only 7.5" long. Once the form sheet is finished printing, the motor is timed to complete the folding by advancing the form against buckle chute 51 until it hits stop 52 when it buckles into the nip of rollers 49 and 53, is captured, creased and fed into buckle chute 54. It follows this chute until the now-folded leading edge hits stop 55, having also picked up moisture across its leading edge from moistening pads 56 in passing, which causes another fold to be created as the form passes between rollers 49 and 57 which also press the moistened glue on the side strips against the opposing paper and the moistened folded edge against the opposing paper and is deposited on belts 58 of the stacker 59 where heavy rollers 60 complete the sealing.

Figure 7:
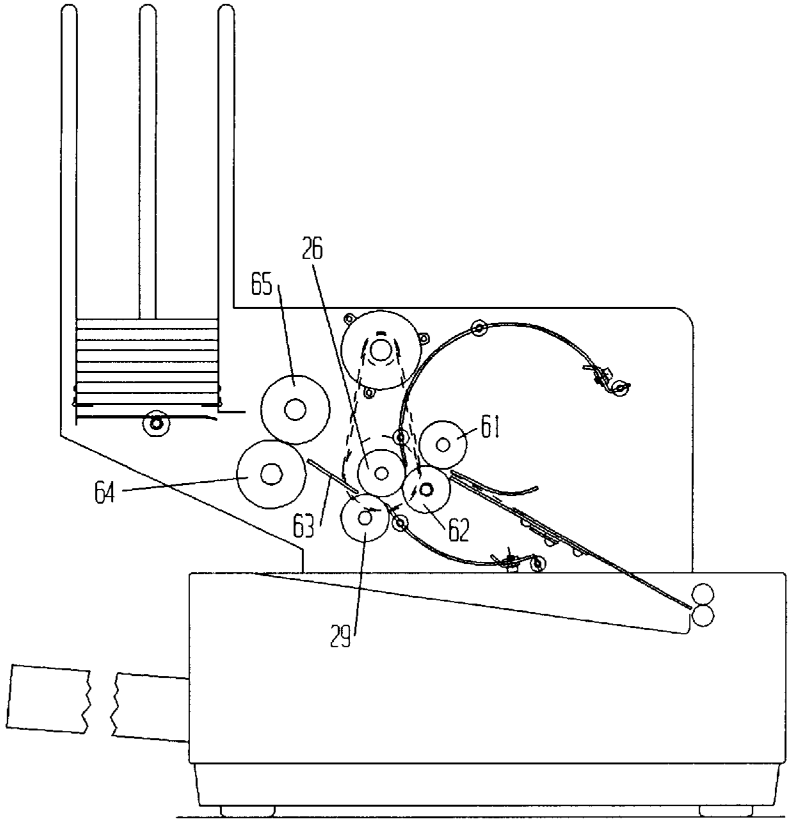
FIG. 7 shows a folder sealer having a set of pressure rollers between the fold rollers and the stacker to seal pressure sensitive form sheets into self-mailers.

The embodiment shown in FIG. 7 depicts the same folder configuration as is depicted in FIG. 3 but with a pressure sealing system to be used on self-mailer form sheets having pressure sensitive glue for sealing. Absent the moisture applicator pads and substitution of 8½ rollers 61 and 62 for 7½" rollers 20 and 21, the paper path is identical until the folded form exits rollers 26 and 29 where it is led by guide 63 into high pressure rollers 64 and 65 which seal the adhesive. The finished self-mailer is then guided into the same bottom-up stacker as shown in FIG. 3.

Therefore, although the invention has been described with reference to certain preferred embodiments, it will be appreciated that other folding and mounting apparatus may be devised, which are nevertheless within the scope and spirit of the inventions defined by the claims appended hereto.

I claim:

1. Apparatus for capturing, folding and sealing a form sheet to prepare a self-mailer as it exits a desktop printer having a print-side-down output accumulation tray on its upper structure, comprising:

a) a paper guide arranged under a folding machine, said folding machine mounted above a desktop printer said guide being extendible so that, in its extended position, it will deflect said form sheets exiting said printer from said printer's normal output accumulation tray upwards;

b) folding and sealing means configured to receive said form sheet output from said paper guide for folding and sealing said form sheet into a mailable self-mailer format;

c) transport means to transport said folded self-mailers into an accumulating stacker;

d) said paper guide, in its unextended position, permitting normal printer output exiting said printer to stack in its usual manner in its output accumulation tray; and, e) an opening under said folding and sealing apparatus permitting retrieval of said normal printer output from said output accumulation tray.

2. Apparatus as described in claim 1 where said folding mechanism is substantially adapted to seal form sheets having re-moistenable glue strips disposed on the side opposite the print side of said form sheets.

3. Apparatus as described in claim 1 where said folding mechanism is adapted to seal form sheets having re-moistenable glue strips disposed on the print side of said form sheets.

4. Apparatus as described in claim 1 where said folding mechanism is adapted to seal form sheets having pressure sensitive glue strips disposed on either side of said form sheets.

* * * * *